Aug. 21, 1962 C. WHEATLEY 3,050,077
DOUBLE SEALED GATE VALVE
Filed May 11, 1959

INVENTOR.
Charles Wheatley
BY
C. M. McKnight
ATTORNEY

United States Patent Office 3,050,077
Patented Aug. 21, 1962

3,050,077
DOUBLE SEALED GATE VALVE
Charles Wheatley, 414 S. Detroit, Tulsa, Okla.
Filed May 11, 1959, Ser. No. 812,225
3 Claims. (Cl. 137—312)

This invention relates to improvements in valve structures, and more particularly, but not by way of limitation, to an improved double seal gate valve structure for utilization with flow lines.

Gate valves are frequently interposed in flow lines or distribution pipe lines wherein gas, oil or any suitable fluid is transported therethrough for delivery to a consumer. Normally the distribution line is utilized for delivery of the fluid to a plurality of consumers, and the gate valves are interposed in the line at predetermined positions for stopping the flow or diverting the flow of the product when the custody of the product is changed. Gate valves are often found to leak under actual working conditions, and as a result, at present it is the usual practice to provide two gate valves in the flow line at each position wherein it is desired to stop the flow of the fluid upon a custody transfer thereof. The two gate valves are spaced apart in the line and a bleeder valve is provided therebetween in order that any fluid which might leak through the first valve will be discharged to a sump through the bleeder valve for return to the flow line whereby the fluid will not be inadvertently delivered to the wrong consumer. The second gate valve is provided to assure an efficient stoppage of the flow of the fluid upon a custody transfer thereof. It will be apparent that this double valve usage is expensive in both the original installation, as well as the upkeep or maintenance thereof.

The present invention contemplates a novel gate valve particularly designed and constructed to eliminate the necessity of providing two valves in the flow line for stopping the flow of fluid therethrough upon a custody transfer of the fluid. The novel valve structure is provided with a double seal arrangement having a bleeder valve interposed therebetween. In the event that fluid should leak past the first seal member, the bleeder valve will function to direct the fluid into a sump, or the like, for return to the flow line or into storage, thus assuring that one consumer will not receive the fluid or product intended for a second consumer. The second seal member assures that no fluid will move by the bleeder valve into the flow line of the second consumer. The novel gate valve is simple and efficient in operation and economical and durable in construction.

It is an important object of this invention to provide a novel gate valve adapted to be interposed in a flow line for intermittently stopping the flow of fluid therethrough.

It is another object of this invention to provide a novel gate valve wherein a double seal is provided to eliminate the necessity of interposing two valves in a flow line for stopping the flow of fluid therethrough upon a custody transfer of the fluid product.

Another object of this invention is to provide a novel gate valve particularly designed and constructed to facilitate the opening and closing thereof during high pressure conditions, as well as low pressure conditions.

A further object of this invention is to provide a novel gate valve which is simple and efficient in operation and economical and durable in construction.

Other objects and advantages of the invention will be evident from the following detailed description, read in conjunction with the accompanying drawings, which illustrate my invention.

Figure 1:
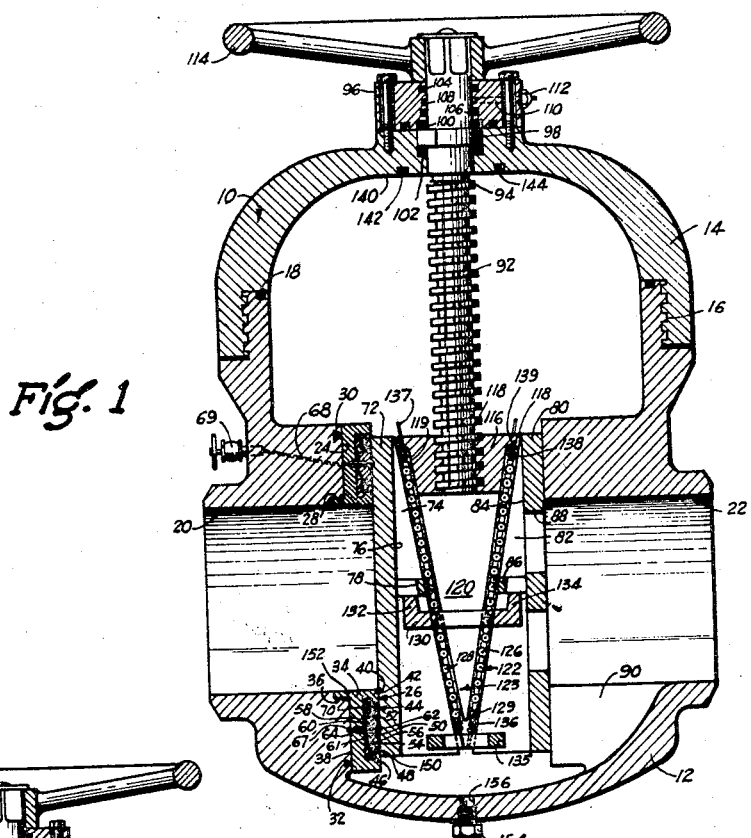
FIGURE 1 is a sectional elevational view of a gate valve embodying the invention and depicting the valve in a closed position.

Referring to the drawings in detail, reference character 10 generally indicates a gate valve comprising a body portion 12 having a substantially dome shaped cover member 14 threadedly secured thereto at 16. A seal ring 18 is interposed between the body 12 and the cover 14 to preclude leakage of fluid therebetween. The body 12 is provided with an inlet bore 20 extending transversely therein from the up stream side of the valve 10. An outlet bore 22 is provided in the body 12 and extends oppositely from the inlet bore 20 on the down stream side of the valve 10. The flow of fluid through the valve 10 is preferably from left to right as viewed in FIG. 1.

An annular shoulder 24 (FIG. 1) is provided on the interior extremity of the inlet bore 20 for receiving a double seal unit generally indicated at 26. The bore 20 is provided with a threaded annular recess 28 adjacent the shoulder 24 for threadedly securing the seal unit 26 thereagainst as will be hereinafter set forth. An annular groove 30 is provided in the shoulder 24 adjacent the seal unit 26 for receiving an O-ring type seal member 32 therein for precluding leakage of fluid between the shoulder 24 and the seal unit 26.

The double seal unit 26 comprises a sleeve member 34 which is provided with external threads 36 cooperating with the threads 28 for securing the seal unit 26 within the valve body 12. An outwardly extending circumferential flange 38 is provided on the outer periphery of the sleeve 34 and is disposed adjacent the thredas 36 and spaced slightly from the opposite end 40 of the sleeve 34. An outwardly extending circumferential flange 42 is provided on the sleeve 34 at the end 40 thereof, and is spaced from the flange 38 for receiving an annular seal member 44 therebetween, as clearly shown in FIG. 1. The flange 42 is of considerably less length than the flange 38. A complementary inwardly directed flange 46 is provided at the outer periphery of the flange 38 and is spaced therefrom for receiving a second seal member 48 therebetween. The seal members 44 and 48 are preferably substantially identical in construction as will be hereinafter set forth. An annular ring 50 is interposed between the seal members 44 and 48 and is provided with oppositely extending circumferential flanges 52 and 54 for retaining the seal members 44 and 48 in position adjacent the flange 38. The ring 50 may be removably secured to the flange 38 in any suitable manner, such as a plurality of spaced screws 56. A pair of spaced annular grooves 58 and 59 are provided in the ring 50 adjacent the flange 38 for receiving a sealing ring 60 and 61, respectively, therein for precluding leakage of fluid between the ring 50 and the flange 38. An annular groove 62 is provided on the opposite face of the ring 50 and is preferably centrally disposed thereon. A plurality of bores or passageways 64 extend from the groove 62 through the ring 50 and flange 38 to provide communication with a second annular groove 67 provided on the shoulder 24. The groove 67 is in communication with a passageway 68 which extends into communication with a suitable bleeder valve 69 for a purpose as will be hereinafter set forth.

The seal member 44 is preferably of the type disclosed in my copending application Serial No. 534,131, filed September 13, 1955, and entitled "Flanged Sealing Ring," now Patent No. 2,886,284. The seal member 44 is substantially T-shaped in cross section and is provided with a rigid annular core member 70 for precluding accidental dislodging of the seal under pressure. The seal member 48 is identical in structure to the seal member 44, except that the overall diameter of the seal 44 is smaller than the seal 48, thus providing a double seal arrangement for the valve 10.

A disc member 72 is adapted to be disposed adjacent the seal unit 26 and spans the bore 20 in a closed position of the valve 10, as clearly shown in FIG. 1, to preclude flow through the valve. A pair of vertical disposed and tapered plates 74 are secured in spaced relation on the inner face 76 of the valve disc or plate 72. A lifting bracket 78 is secured to the inner face 76 of the valve disc 72 between the plates 74 and along the transverse center line (not shown) of the valve disc 72 for a purpose as will be hereinafter set forth.

A second valve disc member 80 is adapted to be disposed adjacent the outlet bore 22 in a closed position of the valve 10 as shown in FIG. 1. A pair of vertically disposed and tapered plates 82 are secured in spaced relation on the inner face 84 of the second disc 80. A lifting bracket 86 is secured to the inner face 84 of the disc 80 between the plates 82 and along the transverse center line (not shown) of the disc 80 for a purpose as will be hereinafter set forth. The valve disc 80 is perforated or provided with a plurality of spaced apertures 88 to provide for down stream flow of fluid from the valve body 12 in the closed position of the valve 10 in order that fluid will not be trapped in the valve body 12 and cause undue pressure therein. In addition, a plurality of open recesses or slots 90 are provided in the valve body 12 adjacent the lower portion of the outlet port 22 whereby immediate flow through the valve 10 will be provided when the up stream valve disc 72 is opened in the manner as will be hereinafter set forth.

A threaded shaft 92 extends downwardly through the cover 14 and into the valve body 12. The shaft 92 extends through a bore 94 in the cover 14 and upwardly therefrom through a packing gland 96. An outwardly extending circumferential shoulder 98 is provided on the shaft 92 and cooperates with a pair of spaced thrust bearings 100 and 102 to provide for rotation of the shaft 92 with no vertical movement thereof. A pair of spaced packing members or seal rings 104 and 106 are provided in the packing gland 96 adjacent the shaft 92 to preclude leakage of fluid therebetween. An annular groove 108 is provided on the inner periphery of the packing gland 96 between the sealing rings 104 and 106 and is in communication with a passageway 110 which in turn is in communication with a fitting member 112 through which a suitable lubricant may be inserted for assuring a proper lubrication between the packing gland 96 and the rotatable shaft 92 extending therethrough. A suitable hand wheel 114 is provided on the outer extremity of the shaft 92 for manual rotation of the shaft during operation of the valve 10 as will be hereinafter set forth.

An apertured block 116 is threadedly secured to the shaft 92. The block 116 is substantially rectangularly shaped with tapered or diverging side walls 118 and 119 adapted to receive a pair of oppositely disposed triangular shaped plate members 120 and 121, which form a wedge member generally indicated at 123 for supporting two spaced sets of roller members 122 and 124. Each set of roller members comprises a pair of diverging roller strips 126 and 128, as clearly shown in FIG. 1, and similar to the roller arrangement set forth in my patent No. 2,676,780, issued April 27, 1954, and entitled "Gate Valve." Each roller strip comprises a plurality of roller members 129 disposed in parallel relationship for a purpose as will be hereinafter set forth.

Figure 2:
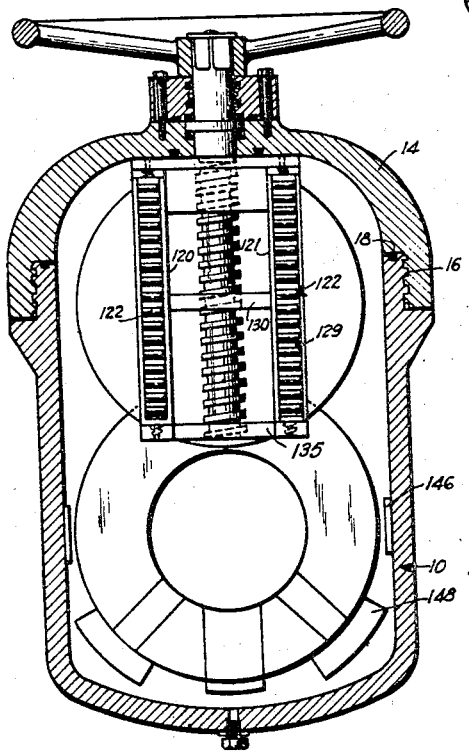
FIGURE 2 is a sectional elevational view of a gate valve embodying the invention taken at right angles with respect to FIG. 1 and depicting the valve in an open position.
Figure 3:
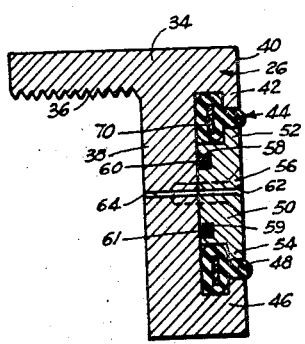
FIGURE 3 is an enlarged sectional view of the double seal means of the novel gate valve.

An apertured lifting bracket 130 extends transversely between the triangular plate members 120 and 121 and is secured to the plates in any suitable manner, such as by welding, or the like. The opposite ends 132 and 134 of the lifting bracket or arm 130 are turned upwardly for moving into contact with the lifting brackets 78 and 86 upon an upward movement of the wedge shaped or diverging sets of rollers 122 and 124 as will be hereinafter set forth. An apertured plate member 135 extends transversely between the triangular plates 120 and 121 adjacent the lower end thereof for receiving one end of a plurality of springs 136. The springs 136 are disposed around a rod 137 which is provided for each roller strip and extends longitudinally therethrough. The springs 136 bear against the lowermost portion of each of the roller strips and cooperate with a plurality of springs 138 disposed adjacent the uppermost portion of each roller strip for retaining the rollers in position. An outwardly extending circumferential flange 139 is provided at the uppermost end of the block 116 for retaining the upper springs 138 adjacent the roller strips. In addition, the circumferential flange 139 bears against the inner surface 140 of the cover 14 adjacent the threaded shaft 92 when the wedge 123 is in the uppermost position as shown in FIGS. 2 and 3. The circumferential flange 139 bears against an annular seal ring 142 which is disposed in an annular groove 144 provided on the surface 140 for precluding leakage of fluid between the shaft 92 and the cover 14 in the full open position of the valve 10. Thus, the packing gland 96 may be removed for repairs or replacement when the valve 10 is in an open position without leakage of fluid from the valve.

A plurality of inwardly directed guide lugs 146 are provided on the inner periphery of the valve body 12 adjacent each of the discs 72 and 80 to guide the movements of the discs during the opening and closing of the valve 10, as will be hereinafter set forth. A plurality of spaced inwardly directed stop members 148 are provided in the valve body 12 for limiting the downward movement of each of the valve discs 72 and 80 during the closing of the valve 10, as will be hereinafter set forth.

*Operation*

The valve 10 is interposed in a flow line (not shown) in any well known manner (not shown) wherein it is desired to provide intermittent flow through the line. In the closed position of the valve 10, as shown in FIG. 1, the wedge 123 is in the lowermost position within the valve body 12. The configuration of the wedge 123 cooperates with the configuration of the tapered plates 74 for urging the valve disc 72 into a sealing contact with the double seal unit 26, thus precluding flow of fluid through the valve. Similarly, the wedge 123 cooperates with the tapered plates 82 for urging the valve disc 80 in a closed position adjacent the outlet portion or bore 22. However, the apertures 88 in the disc 80 permit any fluid trapped within the valve body 12 to flow out the bore 22 and preclude any undue pressure build up within the valve.

The double seal unit 26 in contact with the valve disc 72 assures that no fluid will flow through the valve 10 in the closed position thereof. In the event that any fluid should leak past or around the inner or first seal ring 44, it will collect in the annular groove 62 and move through the bores 64 into the annular groove 67, whereby the fluid will be discharged through the passageway 68 and out the bleeder valve 69. The fluid discharged from the bleeder valve 69 may be directed to a sump, or the like, if desired, to assure that no fluid will be lost.

In order to open the valve 10, the handle or wheel 114 is manually rotated to rotate the shaft 92. As hereinbefore set forth, the shaft 92 rotates freely, but does not move vertically. Thus, the threaded connection between the shaft 92 and the block 116 will cause the block to move upwardly on the shaft 92 during the rotation thereof. The block 116 and all the portions of the wedge 123 will move simultaneously upward upon rotation of the shaft 92. As the sets of rollers 122 and 124 move upwardly, the rollers 129 roll along the tapered edge of the plates 74 and 82, thus greatly facilitating the opening of the valve. The rolling action of the rollers 129 permits the valve 10 to be readily opened or closed regardless of the pressure conditions existing within the valve.

As the wedge 123 moves upwardly, the lifting bracket 130 moves upwardly therewith whereby the upturned ends 132 and 134 thereof are brought into the lifting brackets 78 and 86, respectively. Upon a further upward movement of the wedge 123, the lifting bracket 130 picks up the lifting brackets 78 and 86 for lifting the valve discs 72 and 80. Continued upward movement of the wedge 123 raises the valve discs 72 and 80 for opening of the valve 10. At the moment that lower edge 150 of the valve disc 72 moves above the lower edge 152 of the inlet bore 20, fluid begins to flow into the valve body 12, and the slots or openings 90 provided in the valve body 12 adjacent the outlet bore 22 permits an immediate discharge of the fluid from the valve body 12.

The wheel 114 may be rotated until the block 116 is in contact with the inner surface 140 of the cover 14, as shown in FIGS. 2 and 3. In this position, the valve 10 is in a full open position, and the discs 72 and 80 are supported in the raised position by the cooperating lifting brackets 130, 78 and 86. It will be apparent that the seal member 142 precludes leakage of fluid between the block 116 and the cover 14 in the full open position of the valve 10, thus providing for replacement of the packing gland 96 without leakage of fluid from the valve.

When it is desired to stop the flow of fluid through the valve 10 for any reason, the wheel 114 may be manually rotated in a reverse direction for rotating the shaft 92 in a direction for causing the block 116 to move downwardly thereon. As hereinbefore set forth, the wedge 123 moves simultaneously with the block 116, and the discs 72 and 80 supported on the lifting bracket 130 will move downward therewith. The cooperating wedge 123 and tapered plates 74 and 82 preclude any possibility of the discs 72 and 80 floating upwardly in the fluid during the closing of the valve. The shaft 92 is rotated until the discs 72 and 80 rest on the stop members 148. This assures that the discs are sufficiently lowered within the valve body 12 for efficiently closing the valve 10 and precluding the flow of fluid therethrough. As hereinbefore set forth, any fluid trapped within the body 12 upon closing of the valve may flow through the apertures 88 in the valve disc 80 for discharge through the outlet bore 22. In addition, a suitable drain plug 154 is threadedly secured in an aperture 156 provided in the lower portion of the body 12 for draining fluid from the body 12 when desired.

From the foregoing, it will be apparent that the present invention provides a novel gate valve provided with a double seal unit for precluding the necessity of installing two separate valves in a flow line to assure an efficient sealing or stoppage of the fluid flow. The novel valve is provided with roller members cooperating with a wedge portion for facilitating the opening and closing of the valve regardless of the pressure conditions encountered during utilization thereof. The valve is simple and efficient in operation and economical and durable in construction.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:
1. A gate valve comprising a body, an inlet and outlet port provided in the body, a removable valve seat provided for the inlet port, a wedge member reciprocally disposed in the body transversely of the inlet and outlet ports, said wedge member provided with oppositely disposed wedge faces, a pair of valve discs disposed on opposite sides of the wedge and spaced therefrom, one of said discs cooperating with the valve seat for precluding fluid flow through the valve in a closed position thereof, bearing means carried by the wedge member, means for reciprocating the wedge member, means interconnecting the wedge member with the valve discs to move the valve discs from seating to non-seating relation to the valve seat, an inner seal member provided on the valve seat around the inlet port for sealing engagement with said one valve disc, an outer seal member provided on the valve seat around the inner seal member for engagement with said one valve disc, and retaining means interposed between the seal members for securing the seal members on the valve seat, and passageway means provided in the valve seat and retaining means to discharge any fluid leaking around the inner seal to preclude discharge thereof through the outlet port.

2. A gate valve comprising a body, a cover secured to the body, an inlet and outlet port provided in the body, a removable valve seat provided for the inlet port, a wedge member reciprocally disposed in the body transversely of the inlet and outlet ports, said wedge member provided with oppositely disposed wedge faces, a pair of valve discs disposed on opposite sides of the wedge and spaced therefrom, one of said discs cooperating with the valve seat for precluding fluid flow through the valve in a closed position thereof, roller means carried by the wedge member, means for reciprocating the wedge member, means cooperating with the roller means for facilitating reciprocation of the wedge member by reducing the friction present when the wedge member is moved vertically, means precluding leakage between the cover and the reciprocating means, means interconnecting the wedge member with the valve discs to move the valve discs from seating to non-seating relation to the valve seat, a first resilient seal member provided on the valve seat around the inlet port for sealing engagement with said one valve disc, a second resilient seal member provided on the valve seat around the first seal member for sealing engagement with said one valve disc, retaining means interposed between the seal members for retaining the seal members on the valve seat, and passageway means provided in the valve seat and retaining means to discharge any fluid leaking around the inner seal to preclude passage thereof through the outlet port, and means in the body providing for immediate discharge of fluid through the outlet port upon unseating of the valve discs.

3. A gate valve comprising a body, a cover secured to the body, inlet and outlet ports provided in the body, a valve disc disposed in the body for intermittently precluding flow of fluid through the inlet port, means disposed within the body for moving the valve disc reciprocally therein into alternate open and closed positions with respect to the inlet port, guide means provided in the body for facilitating movement of the valve disc, stop means provided in the body for limiting the movement of the valve disc in one direction for assuring a full closed position therefor, removable seal means cooperating with the valve disc in a closed position thereof for precluding leakage between the valve body, said seal means comprising a valve seat, a first seal member disposed concentrically around the inlet port and a second seal member spaced concentrically from the first seal member, and retaining means interposed between the seal members and secured to the valve seat for securing the seal members on the valve seat, and passageway means provided in the retaining means and valve seat for discharging any fluid leaking around the first seal to preclude discharge thereof through the outlet port.

References Cited in the file of this patent
UNITED STATES PATENTS

| | | |
|---|---|---|
| 660,995 | Murray | Oct. 30, 1900 |
| 1,134,811 | Berger | Apr. 6, 1915 |
| 1,149,848 | Marsh | Aug. 10, 1915 |
| 1,913,027 | Griffith | June 6, 1933 |
| 2,676,780 | Wheatley | Apr. 27, 1954 |
| 2,747,600 | Laurent | May 29, 1956 |